United States Patent
Olkkonen et al.

(10) Patent No.: US 11,892,623 B2
(45) Date of Patent: Feb. 6, 2024

(54) EXIT PUPIL EXPANDER

(71) Applicant: DISPELIX OY, Espoo (FI)

(72) Inventors: Juuso Olkkonen, Espoo (FI); Petri Myöhänen, Espoo (FI)

(73) Assignee: DISPELIX OY, Espoo (FI)

( * ) Notice: Subject to any disclaimer, the term of this patent is extended or adjusted under 35 U.S.C. 154(b) by 720 days.

(21) Appl. No.: 17/041,302

(22) PCT Filed: Feb. 19, 2019

(86) PCT No.: PCT/FI2019/050130
§ 371 (c)(1),
(2) Date: Sep. 24, 2020

(87) PCT Pub. No.: WO2019/185973
PCT Pub. Date: Oct. 3, 2019

(65) Prior Publication Data
US 2021/0072534 A1   Mar. 11, 2021

(30) Foreign Application Priority Data
Mar. 28, 2018 (FI) ..................... 20185291

(51) Int. Cl.
*G02B 5/18* (2006.01)
*F21V 8/00* (2006.01)
*G02B 6/124* (2006.01)
*G02B 27/00* (2006.01)
*G02B 27/01* (2006.01)
(Continued)

(52) U.S. Cl.
CPC ....... *G02B 27/0081* (2013.01); *G02B 5/1814* (2013.01); *G02B 6/0016* (2013.01); *G02B 6/0038* (2013.01); *G02B 6/124* (2013.01); *G02B 27/0101* (2013.01); *G02B 27/0103* (2013.01); *G02B 27/0172* (2013.01);
(Continued)

(58) Field of Classification Search
CPC ...... G02B 5/1814; G02B 6/00; G02B 6/0016; G02B 6/0038; G02B 6/124; G02B 27/0081; G02B 27/0101; G02B 27/0103; G02B 27/0172; G02B 27/42; G02B 27/4272; G02B 2027/0174
See application file for complete search history.

(56) References Cited

U.S. PATENT DOCUMENTS 7,764,413 B2   7/2010 Levola
8,160,411 B2 * 4/2012 Levola ............... G02B 27/0172
                                                    359/569
(Continued)

FOREIGN PATENT DOCUMENTS

CN   101103297 A   1/2008
CN   106338832 A   1/2017
WO   2017178781 A1  10/2017

OTHER PUBLICATIONS

Finnish Office Action dated Oct. 8, 2018 as received in application No. 20185291.
(Continued)

*Primary Examiner* — Ryan A Lepisto
(74) *Attorney, Agent, or Firm* — Maschoff Brennan

(57) ABSTRACT

There is provided an exit pupil expander (EPE) for use in a diffractive display, the EPE comprising a plurality of diffractive zones on a waveguide and a plurality of non-diffractive zones between at least some of the diffractive zones.

20 Claims, 2 Drawing Sheets

(51) Int. Cl.
  *G02B 27/42* (2006.01)
  *G02B 6/00* (2006.01)
(52) U.S. Cl.
  CPC ......... *G02B 27/42* (2013.01); *G02B 27/4272* (2013.01); *G02B 6/00* (2013.01); *G02B 2027/0174* (2013.01)

(56) References Cited

U.S. PATENT DOCUMENTS

| | | | |
|---|---|---|---|
| 8,320,032 B2 * | 11/2012 | Levola | G02B 27/0081 359/13 |
| 8,493,662 B2 * | 7/2013 | Noui | G02B 27/0081 349/11 |
| 8,593,734 B2 * | 11/2013 | Laakkonen | G02B 27/0081 359/13 |
| 8,717,676 B2 * | 5/2014 | Rinko | G02B 6/0061 359/569 |
| 9,335,604 B2 * | 5/2016 | Popovich | G02B 5/1828 |
| 9,456,744 B2 * | 10/2016 | Popovich | G02F 1/2955 |
| 9,939,647 B2 * | 4/2018 | Vallius | G02B 27/0081 |
| 10,267,970 B2 * | 4/2019 | Jones, Jr. | G02C 11/10 |
| 10,451,799 B2 * | 10/2019 | Klug | G02B 27/0172 |
| 11,086,059 B2 * | 8/2021 | Schultz | G02B 27/0081 |
| 11,086,065 B2 * | 8/2021 | Vartiainen | G02B 6/0038 |
| 11,415,805 B2 * | 8/2022 | Huang | G02B 27/0093 |
| 2006/0013277 A1 | 1/2006 | Fuse | |
| 2010/0214659 A1 | 8/2010 | Levola | |
| 2010/0284085 A1 | 11/2010 | Laakkonen | |
| 2011/0176218 A1 | 7/2011 | Noui | |
| 2017/0299865 A1 | 10/2017 | Vallius et al. | |
| 2018/0052320 A1 | 2/2018 | Curtis et al. | |
| 2018/0052501 A1 * | 2/2018 | Jones, Jr. | G06F 1/163 |
| 2021/0311313 A1 * | 10/2021 | Ma | G02B 27/44 |
| 2022/0004003 A1 * | 1/2022 | Eash | G02B 27/0172 |
| 2022/0214503 A1 * | 7/2022 | Waldern | G02B 6/34 |

OTHER PUBLICATIONS

Chinese Office Action dated Aug. 26, 2021 as received in application No. 201980010104.1.

* cited by examiner

EXIT PUPIL EXPANDER

FIELD OF THE INVENTION

The invention relates to diffractive display technology. In particular, the invention relates to lightguide-based diffractive display elements comprising an exit pupil expander (EPE). Such display elements can be used in personal displays, such as head-mounted displays (HMDs), for example near-to-eye displays (NEDs), and head-up displays (HUDs).

BACKGROUND OF THE INVENTION

HMDs and HUDs can be implemented using waveguide technology. Light can be coupled to a waveguide, redirected therein and coupled out of the waveguide using diffraction gratings. In one conventional display design, light is directed from a projector to an in-coupling grating, which diffracts the incoming light into the waveguide, where it propagates via total internal reflections towards an out-coupling grating via an EPE grating to extend the viewable area of the display laterally. EPEs typically comprise a grating which has grating lines oblique with respect to the grating line orientation of the in-coupling grating and the propagation direction of light incoming from the in-coupling grating.

Like all gratings, also EPE gratings generally cause losses and disturbances. This decreases the brightness and uniformity of the final image formed and causes image imperfections, such as colour imbalance.

Thus, there is a need for improved exit pupil expansion solutions and improved waveguide displays.

SUMMARY OF THE INVENTION

It is an aim of the invention to increase the image quality of waveguide displays. Particular aims are to increase the brightness (total efficiency), uniformity and/or color balance of waveguide displays. One aim is to provide an EPE solution that relieves geometric constraints of EPE shapes.

The aim is achieved by the what is stated in the independent claims.

According to one aspect, there is provided an exit pupil expander (EPE) for use in a diffractive display, the EPE comprising a plurality of diffractive zones (grating zones) on a waveguide and a plurality of non-diffractive zones (non-grating zones) between at least some of the diffractive zones. The diffractive zones and non-diffractive zones can be arranged as an irregular or regular two-dimensional pattern.

In other words, there is provided an EPE having an area containing a plurality of diffractive zones and "voids" at which no diffraction, but only total internal reflection from a surface of the waveguide takes place.

According to one aspect, there is provided a diffractive display element for personal displays, the element comprising a waveguide, an in-coupling region for diffractively coupling an image into the waveguide body, an out-coupling region for diffractively coupling the image out of the waveguide body, and an exit pupil expander (EPE) region of the presently disclosed kind between the in-coupling region and the out-coupling region for expanding the exit pupil of the image on the out-coupling region.

According to one aspect, there is provided a personal display device, such as a head-mounted display (HMD) or head-up display (HUD), comprising a diffractive display element of the above kind.

EPE herein means a region in the lateral plane of the waveguide that has the property of extending the exit pupil of light incoming from one lateral direction and outgoing to another lateral direction.

The invention offers significant benefits. The inclusion of voids inside and on the peripheral boundary of the EPE region enables the optimization of geometrically more complex EPEs. Typically, the EPE shape is calculated by simple geometrical calculations using rays propagating with extreme angles inside the waveguide. This leads to a non-optimal solution. The present invention helps to find EPE solutions via numerical optimization that exhibit better performance in terms of color balance and efficiency than the EPE shapes calculated by simple geometrical calculations. The approach can be used also to find EPE structures that allow more compact form factor for the waveguide. Especially, large field of view (>40 deg) EPEs tend to grow so large that the total waveguide size is too big for wearable displays with compact form factor.

The dependent claims are directed to selected embodiments of the invention.

In some embodiments there is at least one first non-diffractive zone is positioned between two diffractive zones in a first direction and at least one second non-diffractive zone is positioned between two diffractive zones in a second direction orthogonal to the first direction. In some embodiments there are at least 10 different (separate) diffractive zones and at least 10 different (separate) non-diffractive zones.

In some embodiments there are at least two diffractive zones and/or at least two non-diffractive zones with different sizes or shapes.

In some embodiments the diffractive zones comprise at least two zones with different grating properties. This allows for performing even more complex EPE functions.

In some embodiments the diffractive zones and non-diffractive zones are dividable in the surface plane of the waveguide into equally shaped unit zones.

In some embodiments at least 20% of the total area of the EPE is formed of non-diffractive zones.

In some embodiments the zones are positioned such that it is possible to draw at least two different cross-sectional lines in along both main optical axes thereof so that the diffractive/non-diffractive profile along those lines is different.

In some embodiments, in the present waveguide element the diffractive zones and non-diffractive zones of the EPE are configured so that at least a majority of light incoming from the in-coupling region is diffracted by at least one diffractive zone, bounced by total internal reflection in at least one non-diffractive zone, and again diffracted by at least one diffractive zone, typically different from the first diffractive zone, before exiting the EPE towards the out-coupling region.

In some embodiments the non-diffractive zones of the EPE are provided therein for increasing the brightness, uniformity or color balance of the display element, compared with a situation where the non-diffractive zones were replaced with diffractive zones.

In some embodiments, the EPE has a width which is at least the same as the width of the out-coupling region.

Next, embodiments of the invention and advantages thereof are discussed in more detail with reference to the attached drawings.

DETAILED DESCRIPTION OF EMBODIMENTS

Figure 1:
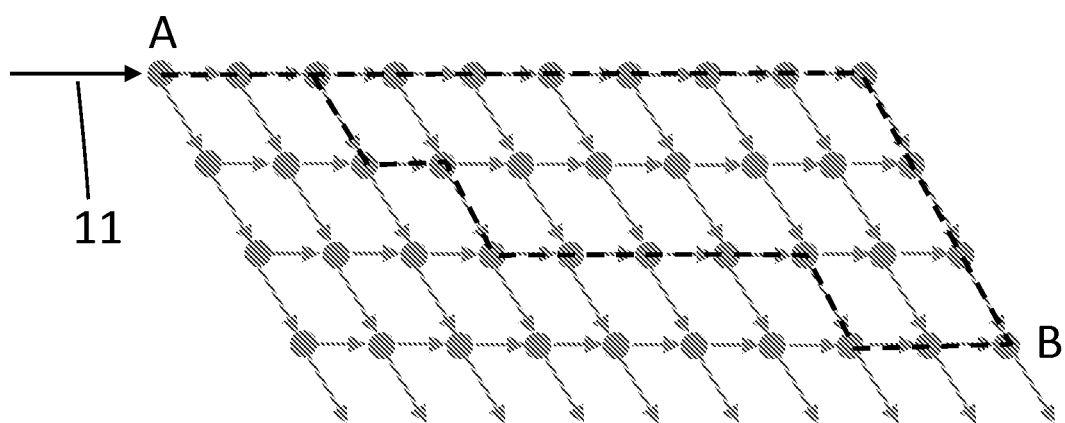
FIG. 1 shows an network of ray pats formed inside an EPE structure due to a single incident ray.

When a light ray propagates through EPE, a complex network of ray paths is formed, in which energy flows typically along two directions. An exemplary network is shown in FIG. 1. The dots show the locations where the rays, generated due to diffraction from the incident ray 11, hit the grating surface. The network structure allows energy transport along multiple ray paths between the points inside the network. Two example paths are shown by dashed lines from the point A to B. As all possible paths are not needed for energy transport, the operation of the EPE structure can be enhanced by allowing also empty regions (voids) to be formed inside EPE and on the peripheral boundary of EPE during numerical optimization.

Figure 2A:
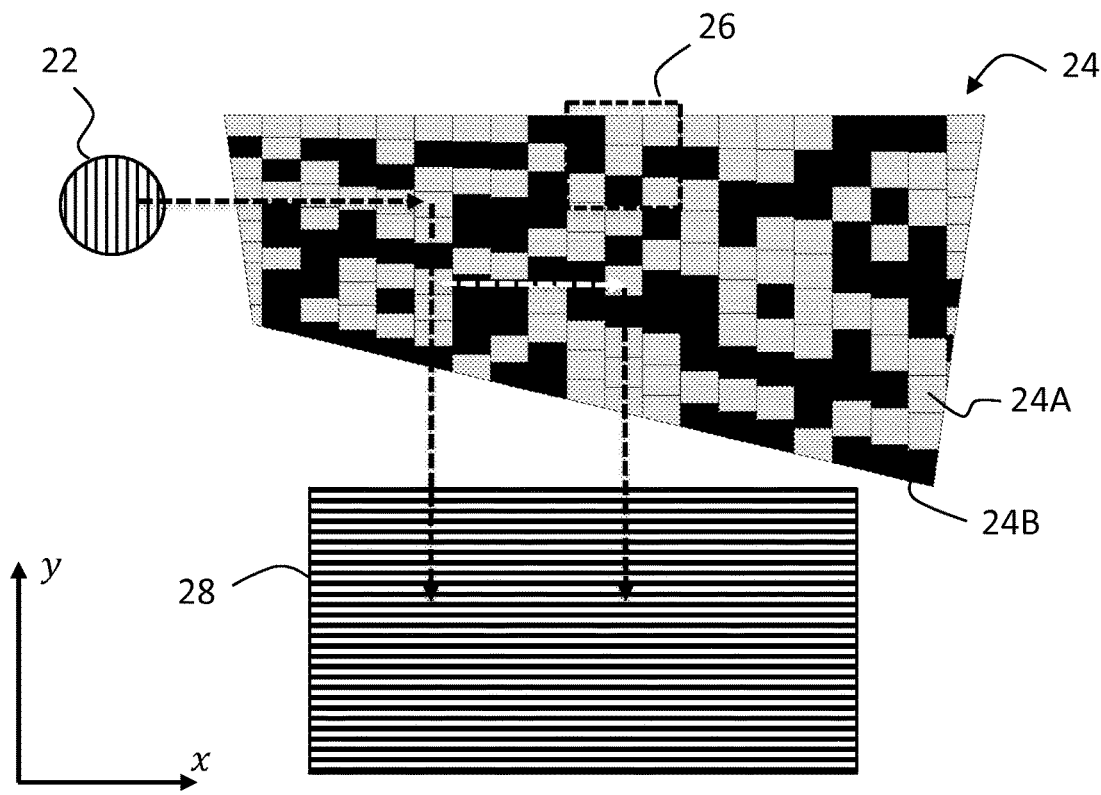
FIG. 2A shows an exemplary EPE in accordance with the invention, positioned optically between an in-coupler and an out-coupler.

FIG. 2A shows an in-coupling grating 22 to which light is directed from a projector, typically essentially perpendicular to the image plane of the figure. Light is diffracted and propagates in the waveguide to the EPE 24 comprising diffractive zones 24A and non-diffractive zones (voids) 24B. The non-diffractive zones 24B are typically simply regions without a grating pattern therein, whereas the diffractive zones comprise a grating. The non-diffractive zones therefore serve as an ordinary waveguide zone, where light rays bounce via total internal reflections without diffraction.

The diffractive zones 24A typically comprise a linear (one-dimensional) grating pattern. The orientation of grating lines and period of grating between each diffractive zones 24A is typically the same, while the microfeature profile, including in particular fill factor and/or height of microfeatures, may differ between the zones.

Figure 2B:
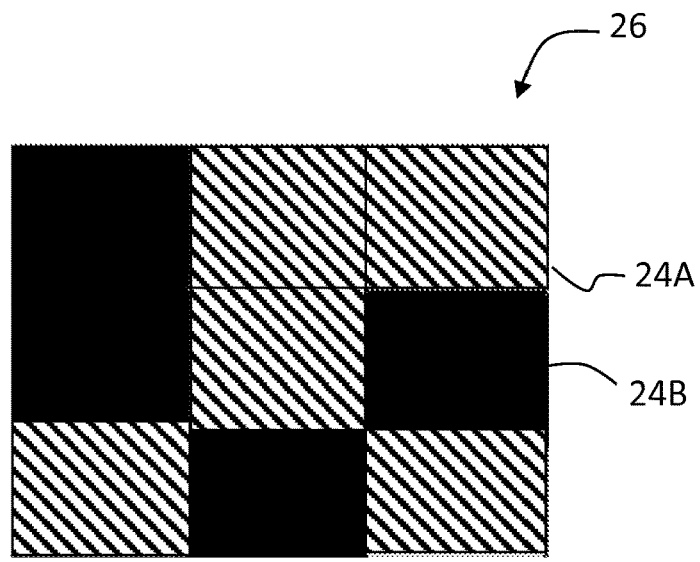
FIG. 2B shows a detail view of a portion of the EPE of FIG. 2A.

The diffractive zones 24A may be unit zones, for example rectangular unit zones like shown in FIG. 2A, or arbitrarily shaped zones without unitary grating lines therein (that is, without the inner boundaries drawn in FIGS. 2A and 2B).

The invention is not restricted to orthogonal geometry as concerns the shapes of the diffractive zones 24A and non-diffractive zones 24B. They can have oblique or curved outer shapes of practically any complexity.

The positioning of the diffractive zones and non-diffractive zones can be determined and optimized using computational techniques known per se for diffractive optical design.

The in-coupling grating 22, EPE 24 and out-coupling grating 28 are typically arranged on a planar waveguide element. The waveguide can be a planar piece of transparent material, typically plastic or glass, having two parallel main surfaces. All gratings and diffractive zones discussed here can be fabricated for example as surface relief gratings (SRGs) or by providing additional material onto the surface as diffractive features, or other diffractive optical elements (DOEs). In one example, the gratings comprise linear features made of at least one oxide or nitride material, such as $TiO_2$, $Si_3N_4$, and $HfO_2$, on a glass waveguide.

It should be noted that the invention is applicable also in various other display geometries and configurations.

In the case of multilayer waveguides, each layer carrying for example a different wavelength band, embodiments of the invention can be applied separately to each layer.

Embodiments of the invention are usable both with broadband illumination and narrowband (including narrow multiband) illumination and projectors.

The invention claimed is:

1. A diffractive display element for displaying an image, comprising:
   a planar waveguide element,
   an in-coupling region for diffractively coupling an image into the planar waveguide element,
   an out-coupling region for diffractively coupling the image out of the planar waveguide element, and
   an exit pupil expander (EPE) region in the planar waveguide element between the in-coupling region and out-coupling region for expanding the exit pupil of the image on the out-coupling region,
   wherein:
   the EPE region includes a plurality of diffractive zones arranged on a surface of the planar waveguide element and a plurality of non-diffractive zones between the diffractive zones, and
   the EPE region includes at least ten different diffractive zones and at least ten different non-diffractive zones positioned such that at least one first non-diffractive zone is positioned between two diffractive zones in a first direction and at least one second non-diffractive zone is positioned between two diffractive zones in a second direction orthogonal to the first direction.

2. The element according to claim 1, wherein the diffractive zones and non-diffractive zones are arranged as an irregular two-dimensional pattern.

3. The element according to claim 1, wherein the diffractive zones and non-diffractive zones are arranged as a regular two-dimensional pattern.

4. The element according to claim 3, further comprising at least two diffractive zones and/or at least two non-diffractive zones with different sizes or shapes.

5. The element according to claim 4, wherein the diffractive zones comprise at least two grating zones with different grating properties.

6. The element according to claim 5, wherein the diffractive zones and non-diffractive zones are dividable in a surface plane of the planar waveguide element into equally shaped unit zones.

7. The element according to claim 6, wherein at least 20% of the total area of the EPE is formed of non-diffractive zones.

8. The element according to claim 7, wherein the diffractive and non-diffractive zones are positioned such that it is possible to draw at least two different cross-sectional lines in along both main optical axes thereof so that the diffractive/non-diffractive profile along those lines is different.

9. The element according to claim 8, wherein the diffractive zones and non-diffractive zones of the EPE region are configured so that at least a majority of light incoming from the in-coupling region is diffracted by at least one diffractive zone, bounced by total internal reflection in at least one non-diffractive zone, and again diffracted by at least one diffractive zone, typically different from the first diffractive zone, before exiting the EPE towards the out-coupling region.

10. The element according to claim 9, wherein the non-diffractive zones of the EPE region are provided therein for increasing the brightness, uniformity or color balance of the display element, compared with a situation where the non-diffractive zones were replaced with diffractive zones.

11. The element according to claim 10, wherein the EPE region has a width which is at least the same as the width of the out-coupling region.

12. A personal display device, such as a head-mounted display (HMD) or head-up display (HUD), comprising a diffractive display element according to claim 1.

13. The element according to claim 1, further comprising at least two diffractive zones and/or at least two non-diffractive zones with different sizes or shapes.

14. The element according to claim 1, wherein the diffractive zones comprise at least two grating zones with different grating properties.

15. The element according to claim 1, wherein the diffractive zones and non-diffractive zones are dividable in the surface plane of the waveguide into equally shaped unit zones.

16. The element according to claim 1, wherein at least 20% of the total area of the EPE is formed of non-diffractive zones.

17. The element according to claim 1, wherein the diffractive and non-diffractive zones are positioned such that it is possible to draw at least two different cross-sectional lines in along both main optical axes thereof so that the diffractive/non-diffractive profile along those lines is different.

18. The element according to claim 1, wherein the diffractive zones and non-diffractive zones of the EPE region are configured so that at least a majority of light incoming from the in-coupling region is diffracted by at least one diffractive zone, bounced by total internal reflection in at least one non-diffractive zone, and again diffracted by at least one diffractive zone, typically different from the first diffractive zone, before exiting the EPE towards the out-coupling region.

19. The element according to claim 1, wherein the non-diffractive zones of the EPE region are provided therein for increasing the brightness, uniformity or color balance of the display element, compared with a situation where the non-diffractive zones were replaced with diffractive zones.

20. The element according to claim 1, wherein the EPE region has a width which is at least the same as the width of the out-coupling region.

* * * * *